United States Patent [19]

Shramo

[11] Patent Number: 4,843,269

[45] Date of Patent: Jun. 27, 1989

[54] LARGE AIR GAP MOTOR

[75] Inventor: Daniel J. Shramo, Rocky River, Ohio

[73] Assignee: Adalet/Scott Fetzer Company, Westlake, Ohio

[21] Appl. No.: 103,518

[22] Filed: Oct. 1, 1987

[51] Int. Cl.[4] ............... H02K 5/128; H02K 21/14
[52] U.S. Cl. .................................. 310/208; 310/86; 310/254; 310/104
[58] Field of Search ............... 310/156, 208, 254, 43, 310/86, DIG. 6, 85, 104

[56] References Cited

U.S. PATENT DOCUMENTS

| 356,902 | 2/1887 | Thomson . | |
|---|---|---|---|
| 3,891,875 | 6/1975 | Laskaris | 310/52 |
| 3,911,299 | 10/1975 | Kristen et al. . | |
| 4,102,040 | 7/1978 | Rich . | |
| 4,130,769 | 12/1978 | Karube | 310/46 |
| 4,255,684 | 3/1981 | Mischler et al. . | |
| 4,259,604 | 3/1981 | Aoki . | |
| 4,292,558 | 9/1981 | Flick et al. | 310/194 |
| 4,363,988 | 12/1982 | Kliman | 310/268 |
| 4,395,815 | 8/1983 | Stanley et al. . | |
| 4,412,146 | 10/1983 | Futterer et al. . | |
| 4,431,932 | 2/1984 | Nathenson et al. | 310/43 |
| 4,445,061 | 4/1984 | Jackson, Jr. | 310/156 |
| 4,644,208 | 11/1984 | Laing . | |
| 4,645,961 | 2/1987 | Malsky | 310/156 |
| 4,709,180 | 11/1987 | Denk | 310/43 |

Primary Examiner—Peter S. Wong
Assistant Examiner—D. L. Rebsch
Attorney, Agent, or Firm—Pearne, Gordon, McCoy & Granger

[57] ABSTRACT

A large air gap electric motor has a permanent magnet rotor with a large air gap to a slotless, cylindrical core surrounding the rotor. A winding of at least one phase is disposed in the large air gap. This winding is disposed on a coil form which is metallized on one face to reflect heat of the winding away from the rotor. The winding is formed of pancake coils, with a plurality of pancake coils around the periphery in each layer and a plurality of layers in the radial dimension. Each pancake coil in successive outer layers becomes progressively larger, to substantially fill the radial air gap. The surrounding slotless core is made from a spirally wound flux conductor, which may be a flat ribbon of rectangular cross section.

10 Claims, 2 Drawing Sheets

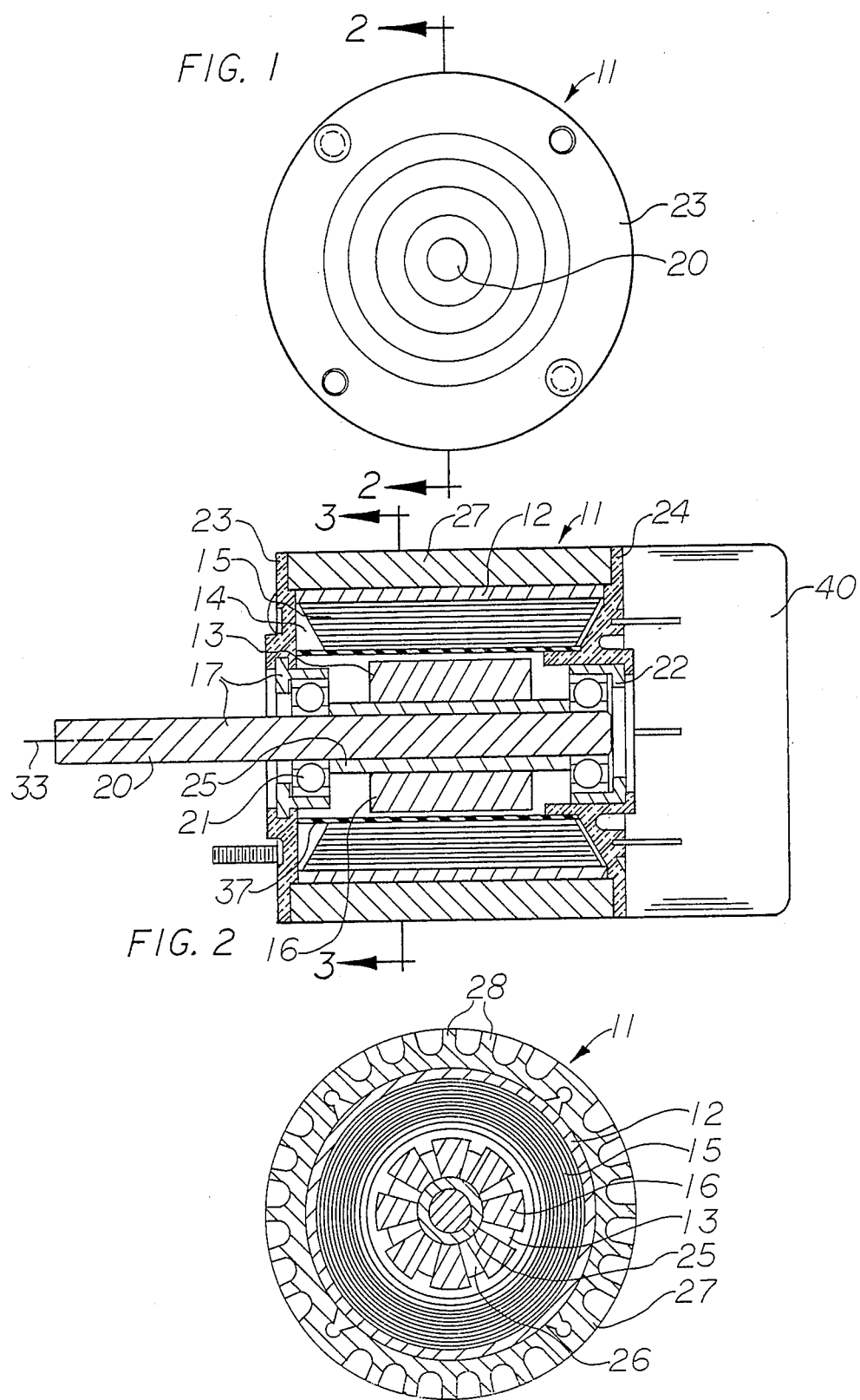

LARGE AIR GAP MOTOR

BACKGROUND OF THE INVENTION

Large air gap motors have previously been proposed, for example, as shown in U.S. Pat. Nos. 3,911,299; 4,130,769; 4,259,604; 4,412,146; 4,445,061; and 4,645,961. U.S. Pat. No. 3,911,299 utilized a slotless core in the stator made from conventional stator laminations which were flat sheets in a plane perpendicular to the rotor axis. Also, this patent recognized the problem of heat from the stator winding getting into the bearings, and proposed the use of an asbestos heat shield on the inside of the stator winding.

U.S. Pat. No. 4,130,769 utilized pancake coils of a single thickness in the armature winding, with these coils arcuately displaced and partially overlapped.

U.S. Pat. No. 4,412,146 utilized a stationary permanent magnet and a stationary outer core with a rotating winding. In U.S. Pat. No. 4,259,604, the design was also one with a rotating coil winding.

U.S. Pat. No. 4,445,061 suggests the use of a ferrite material as the slotless stator core.

U.S. Pat. No. 4,645,961 utilizes a slotless stator, with the armature winding provided as a printed circuit on a flexible insulator material.

U.S. Pat. No. 4,255,684 utilizes a stator core which was originally wound in a spiral, but then was cut apart to form two C-shaped stator yokes.

U.S. Pat. No. 4,395,815 utilized a laminated structure for a stator which was a strip of magnetic material wound on edge, but this had a tendency to buckle as it was wound.

U.S. Pat. No. 4,644,208 utilized a spiral ribbon of magnetic material as a stator yoke; however, this was not in a slotless core configuration.

U.S. Pat. No. 4,292,558 utilized pancake coils in a large machine, such as a turbo generator. These pancake coils were arcuately offset and partially overlapping, so that one side of the coil was not the same distance from the axis as the other side.

SUMMARY OF THE INVENTION

The prior art designs for large air gap motors were primarily for low horsepower motors, and the problem is to achieve a motor with higher horsepower rating at a relatively economical cost.

The problem is solved by an electric motor comprising, in combination, winding means disposed in said air gap, means to provide a magnetic flux circulating from said first to said second magnetically permeable member and return through said air gap, means to provide relative movement between said winding means and said second magnetically permeable member in response to an electrical current flowing in said winding means for a mechanical output of said motor, said winding means being disposed outside of any slots in said first and second magnetically permeable members, and a plurality of pancake coils in said winding means stacked consecutively in said air gap in the direction from said second to said first magnetically permeable members.

The problem is further solved by an electric motor comprising, in combination, first and second magnetically permeable members with an air gap therebetween, winding means disposed in said air gap, means to provide a magnetic flux circulating from said first to said second magnetically permeable member and return through said air gap, means to provide relative movement between said winding means and said second magnetically permeable member in response to an electric current flowing in said winding means for a mechanical output of said motor, and a thin, metallic coating fixed relative to one of said second magnetically permeable members and said winding means and positioned therebetween to reflect heat from said winding means towards said first magnetically permeable member.

The problem is further solved by an electric motor comprising, in combination, first and second magnetically permeable members with an air gap therebetween, winding means disposed in said air gap, means to provide a magnetic flux circulating from said first to said second magnetically permeable member and return through said air gap, means to provide relative movement between said winding means and said second magnetically permeable member in response to an electrical current flowing in said winding means for a mechanical output of said motor, said first magnetically permeable member having a longitudinal axis and enclosing said second member, said first magnetically permeable member being a spirally wound flux conductor.

Accordingly, an object of the invention is to provide a large air gap motor with pancake coils stacked in the air gap and substantially filling the air gap.

Another object of the invention is to provide a large air gap motor with a thin metallic coating inside the stator winding to reflect heat so that it does not radiate to the permanent magnet motor.

A further object of the invention is to provide a large air gap motor with a slotless stator core formed from a spirally wound flux conductor.

Other objects and a fuller understanding of the invention may be had by referring to the following description and claims, taken in conjunction with the accompanying drawings.

BRIEF DESCRIPTION OF THE DRAWINGS

FIG. 1 is an end view of a motor embodying the invention;

FIG. 2 is a longitudinal sectional view on line 2—2 of FIG. 1;

FIG. 3 is a cross-sectional view on line 3—3 of FIG. 2;

DESCRIPTION OF THE PREFERRED EMBODIMENTS

Figure 4:
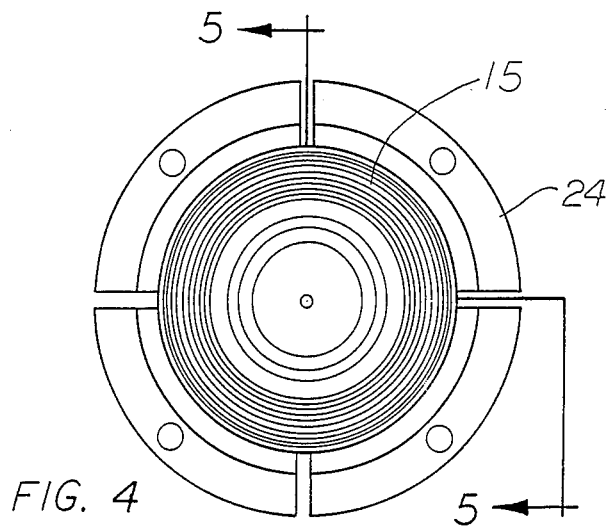
FIG. 4 is an end view of the stator winding.

FIGS. 1-7 illustrate a large air gap motor 11 embodying the invention. This motor has first and second magnetically permeable members 12 and 13, respectively, with a large air gap 14 between these two members. Winding means 15 is disposed in the air gap 14 and substantially fills this large air gap. Means 16 provide a magnetic flux circulating from the first to the second magnetically permeable member and returning through the air gap 14. In this embodiment, the means 16 is a plurality of permanent magnets. Means 17 permits relative motion between the winding means 15 and the second magnetically permeable member 13, in response to an electrical current flowing in the winding means 15 for a mechanical output of the motor. In a linear motor, this is a force directed linearly. In the embodiment shown, this is a rotary motor 11; hence, this force develops a rotational torque. This movement permitting means 17 includes an output shaft 20 journaled in bearings 21 mounted in a metal heat sink 22 and end bells 23 and 24. These end bells carry the first magnetically permeable member 12 as the stator core, and the shaft mounts the second magnetically permeable member 13.

The second magnetically permeable member 13 may be considered the rotor, and it includes a plurality of the permanent magnets 16. These are mounted to a soft iron sleeve 25 by means of an adhesive 26, such as a curable resin, which fills the spaces peripherally between the individual magnets and provides an integral rotor. As shown primarily in FIGS. 2 and 3, the permanent magnets are relatively short in radial dimension and relatively longer in axial extent, so as to withstand the centrifugal forces at high speeds such as 20,000 rpm. The permanent magnets may be of a type suited for use in large air gap motors, for example, samarium cobalt magnets, although other types such as strontium or barium ferrite may be used. In view of the fact that the air gap 14 is large in radial dimension, this permits economy of manufacture, in that the outer peripheral surface of the magnets need not be machined smooth and may be left rough. Therefore, the rotor is generally cylindrical but is not necessarily as smooth a cylindrical outer surface as in many prior art motors.

The end bells 23 and 24 may be made of insulator material, such as plastic, or may be made of aluminum. The non-magnetic material prevents shortcircuiting of the magnetic field, and plastic material is preferred to prevent transferring heat from the winding means 15 to the bearings 21. These bearings are cooled by being mounted in the metal cup-shaped heat sinks 22, and no heat is generated in the rotor 13.

The first magnetically permeable means 12 is a generally cylindrical member in this rotary motor embodiment. It is closely encircled by an aluminum extrusion 27 which has fins 28 for improved radiation and convection cooling.

The first magnetically permeable member 12 carries a changing magnetic flux; hence, it is laminated to minimize hysteresis and eddy current losses. This first magnetically permeable member is made from a spirally wound flux conductor 31. Such flux conductor may be made from the usual lamination steel, or from soft iron, or from a spirally wound helix. The flux conductor 31 was spirally wound, with the width of the ribbon being disposed perpendicular to the shaft axis 33. Again, such member 12 may be slid into the aluminum extrusion 27 while on the mandrel, allowing the permeable member 12 to expand slightly against the inner surface of this aluminum extrusion 27, and then withdrawing the mandrel.

This flux conductor 31 may be potted in a resin, for example, to hold it in place and improve the heat transfer characteristics to the aluminum extrusion 27.

The winding means 15 is constructed from a plurality of stacked pancake coils 36. The winding means 15 establishes electromagnetic poles to cooperate with the permanent magnet poles established by the permanent magnets 16. The motor 11 may be constructed in two, four, six, or any number of poles, and an eight-pole motor is illustrated in the drawings. The permanent magnets 16 are radially magnetized and adjacent ones are of alternate polarity. To coact with this permanent field, one could utilize eight pancake coils consecutively around the periphery of a cylindrical coil form 37; however, a consequent pole design is shown wherein there are only four such pancake coils 36 in a layer consecutively around the periphery of this coil form. As best shown in FIG. 4, each of these pancake coils is arcuate in shape and each spans nearly 90 degrees with this four-coils-perlayer design. There are a plurality of layers of pancake coils, and in the design shown, there are nine such layers. In one motor constructed in accordance with the invention, the nine layers were constructed in accordance with Chart A. With all four such coils in a layer wound in the same direction and connected in series, at any given instant four north poles will be established by the winding means, spaced 90 degrees apart and, as a consequence, south poles will be established intermediate these four north poles. Accordingly, the electromagnetic field will properly cooperate with the permanent field.

CHART A

| Layer No. | I.D. | O.D. | Turns 90° Seg. | Turns/ Layer | Wire Out Term No. |
| --- | --- | --- | --- | --- | --- |
| 1 | 1.281 | 1.349 | 13 | 52 | 1 |
| 2 | 1.357 | 1.425 | 14 | 56 | 2 |
| 3 | 1.433 | 1.501 | 15 | 60 | 3 |
| 4 | 1.509 | 1.577 | 15 | 60 | 2 |
| 5 | 1.585 | 1.653 | 16 | 64 | 3 |
| 6 | 1.661 | 1.729 | 17 | 68 | 1 |
| 7 | 1.737 | 1.805 | 18 | 72 | 3 |
| 8 | 1.813 | 1.881 | 19 | 76 | 1 |
| 9 | 1.899 | 1.957 | 20 | 80 | 2 |

Figure 5:
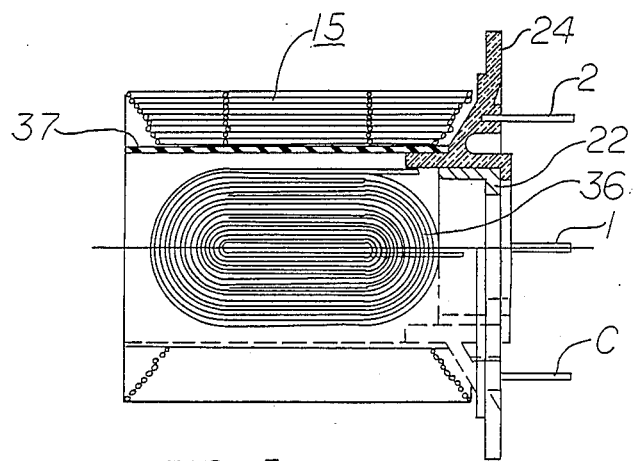
FIG. 5 is a sectional view on line 5—5 of FIG. 4.
Figure 6:
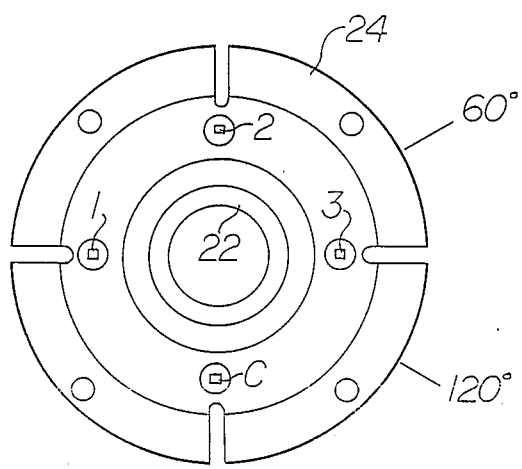
FIG. 6 is an opposite end view of the stator winding of FIG. 5.
Figure 7:
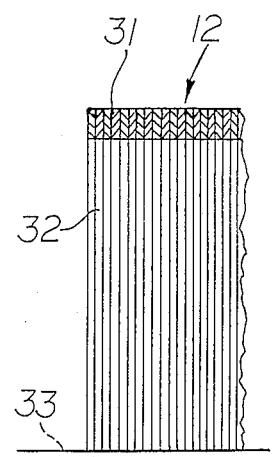
FIG. 7 is an enlarged, partial view of the stator core.

In the motor constructed in accordance with the invention, each coil was started at the center and wound in 90-degree segments with two wire diameters clearance between segments and two wire diameters gap at the start in the center of each. Each layer was continuous-wound for the four segments, with the start of each coil at the common terminal 3, as shown in FIG. 5, and terminated at terminal numbers 1, 2, or C, designated on Chart A. The start of successive layers is staggered 60 degrees, to be commensurate with the connection of the various coils to the various terminals 1, 2, and 3. As an example, the start of coils for layers 1, 6, and 8 will be at the 0-degree reference point on FIG. 6, the start of the coils for layers 2, 4, and 9 will be at the 60-degree reference point on FIG. 6, and the start of the coils for layers 3, 5, and 7 will be at the 120-degree reference mark, as shown on FIG. 6. All of the coils connected to the three terminals 1, 2, and 3 may be considered separate coil groups, or also may be considered phase groups, or phase windings. In this particular embodiment, the coils form at least one phase winding. The reason is that this motor may be considered a permanent field synchronous motor, in this case a three-phase motor. An electronic control module 40 may be physically mounted on the end bell 24 and connected to the terminals 1, 2, 3, and common terminal C. This electronic control module may successively energize the three-phase windings, which are then connected in delta, or connected in Y, as shown herein. This sequential energization of the three-phase windings makes the motor act as a typical three-phase motor for rotation clockwise as viewed in FIG. 6. Thus, both starting torque and running torque are developed in the rotor 13.

The motor 11 may be considered a DC brushless motor, and to accomplish this, the electronic control module 40 may include an inverter to change from DC to AC, to sequentially energize phase windings of the winding means 15. The motor may also be energized from commercial frequency and voltage sources, e.g., 115-volt, 60 Hertz, by first rectifying this voltage and then applying it to the inverter.

As best viewed in FIG. 5, the nine different layers of coils become progressively larger in a direction extending from the second to the first magnetically permeable members 13 and 12. The reason is shown in Chart A wherein the number of turns per coil in each layer becomes progressively larger. By so doing, the total number of turns in layers 1, 6, and 8 equals the number of turns in layers 2, 4, and 9, which equals the number of turns in layers 3, 5, and 7. Also, the total length of conductor is equal, or substantially equal. Thus, the ampere turns for all three phase windings are substantially equal whether the coils are connected in series or in parallel. It will be noted that this increase in the size of coils is both longitudinal and peripheral because the number of turns for the stack of pancake coils progressively increases as the radial dimension increases.

The coils 36 may be wound flat and later arcuately curved onto the coil form 37. Alternatively, they may be wound in the arcuately curved shape on the coil form. An insulation sheet may be placed between layers for coil-to-coil insulation and to provide a smoother surface on which to wind the next layer, displaced, e.g., 60 degrees. When all layers are wound, they preferably are potted with a resin, and to the first permeable member 12.

The thermosetting resin used for potting the winding means 15 may advantageously include aluminum powder or other metal powder, as this will aid transfer of heat from the winding means outwardly through the first permeable member 12 to the aluminum extrusion 27.

The permanent magnet rotor 13 does not have any change in flux during rotation, so there is no heat developed in this rotor, and hence it need not be cooled. The only heat developed in the bearings 21 is windage and friction losses, and these are easily dissipated by the bearings being mounted in the metal heat sinks 22. Heat is developed in the armature or stator windings 15, and these windings are preferably potted in a thermosetting resin, for example, to transmit heat directly to the first magnetically permeable member 12, and through it to the aluminum extrusion 27, which is cooled both by radiation and convection.

A thin metal coating is provided between the relatively moving parts. In this preferred embodiment, this thin metal coating is provided in the air gap 14 to reradiate any heat away from the rotor 13 and toward the principal heat dissipating member, the aluminum extrusion 27. This thin metal coating is preferably a highly polished metal coating of very thin metal, for example, a few Angstroms thick as caused by sputtering an aluminum coating, for example, on a generally cylindrical surface. In the preferred embodiment, this thin metal coating is applied on the coil form 37, and specifically on either the inner or outer face thereof. In the motor constructed in accordance with the invention, this was on the outer face on which the layers of coils were mounted. By so providing this thin metal coating, the heat from the winding means 15 is kept from the rotor, so that the rotor and bearings are cool, for long life. The few Angstroms thickness of the metal coating makes insignificant any eddy current losses in this metal coating.

The thin metallic coating is preferably applied to a highly polished surface so that the metallic coating itself becomes a highly polished reflector. This metal coating is applied to either the second magnetically permeable member 13 or to the winding means, and, as shown, is applied on the winding means, namely the coil form portion of this winding means.

It will be noted that each conductor in a particular pancake coil is disposed at the same radial distance from the shaft axis 33. This greatly aids the packing density, and hence it will be noted that practically the entire air gap is full of conductors of the winding means 15. As shown in FIGS. 2 and 3, the air gap is quite large, and hence there is no need to machine the outer periphery of the rotor 13 but, instead, the magnets may be left rough. This reduces manufacturing cost and time, because the radial length of the air gap is not at all critical, as in many other motor designs. The samarium cobalt magnets possess the properties of high energy, great coercive field strength, high remanence, and good stability to withstand shearing, external fields, and temperature effects.

The motor 11 as disclosed herein is one which meets the objectives of a higher powered motor which is economical to manufacture. The motor may be manufactured in the 0.2 to 2 horsepower range, utilizing a rotor of only about 1.2 inch in diameter. The horsepower range may be achieved by lengthening the axial dimension of the permanent magnet rotor 13 and the winding means 15. The gradually increasing size of the various layers in the winding means 15 takes advantage of the gradually spreading flux path as the radial dimension increases. It will be noted from FIG. 2 that the first magnetically permeable member 12 has a greater longitudinal length than that of the rotor 13. This saves on the cost of the permanent magnets 16 and permits utilizing a design which optimizes the cost of the magnets versus the cost of the copper or other conductor material in the winding means 15. The torque is proportional to the product of the number of turns, amperes, and the total flux. Where the magnets are relatively costly, the same torque may be achieved by minimizing the size of the magnets and increasing the number of turns. The large air gap with the slotless core or slotless first magnetically permeable member 12 permits the use of these many turns of conductor. Since the first magnetically permeable member 12 is slotless, it is more economical and easier to manufacture than a typical AC motor, which utilizes a distributed winding in slots between magnetic teeth in the stator. This motor may be considered a salient pole winding because the four pancake coils in any given layer establish four salient electromagnetic poles even though no magnetically permeable member is disposed centrally in such pancake coil.

The present invention disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the winding construction and the combination and arrangement of motor elements may be resorted to without departing from the spirit and the scope of the invention as hereinafter claimed.

What is claimed is:

1. An electric motor comprising, in combination:
   first and second magnetically permeable members with an air gap therebetween;
   winding means disposed in said air gap;

means to provide a magnetic flux circulating from said first to said second magnetically permeable member and return through said air gap;

means to provide relative movement between said winding means and said second magnetically permeable member in response to an electrical current flowing in said winding means for a mechanical output of said motor;

said winding means being disposed outside of any slots in said first and second magnetically permeable members;

a plurality of pancake coils in said winding means stacked consecutively in said air gap in the direction from said second to said first magnetically permeable members, said plurality of pancake coils including at least four coils with two at one location and two at another location, successive coils at each location becoming progressively larger in the direction towards said first magnetically permeable member, and a larger coil being connected to a smaller coil in at least two coil groups for substantially equal coil turns in said at least two coil groups.

2. An electric motor comprising, in combination:

first and second magnetically permeable members with an air gap therebetween;

winding means disposed in said air gap;

means to provide a magnetic flux circulating from said first to said second magnetically permeable member and return through said air gap;

means to provide relative movement between said winding means and said second magnetically permeable member in response to an electrical current flowing in said winding means for a mechanical output of said motor;

said winding means being disposed outside of any slots in said first and second magnetically permeable members;

a plurality of pancake coils in said winding means stacked consecutively in said air gap in the direction from said second to said first magnetically permeable members;

at least two of said pancake coils being in a stack in a first coil group and at least two other of said pancake coils being in another stack in a second coil group;

said first and second coil groups being at different locations;

successive coils at each location becoming progressively larger in the direction towards said first magnetically permeable member, and a larger coil being connected to a smaller coil in each of said first and second coil groups for substantially equal coil turns in said first and second coil groups.

3. An electric motor as set forth in claim 1, wherein said stacked pancake coils become progressively larger in the direction from said second to said first magnetically permeable member.

4. An electric motor as set forth in claim 1, wherein said stacked pancake coils are divided into a plurality of phase groups; and means to establish substantially the same length of conductors in each phase group.

5. An electric motor as set forth in claim 1, wherein said plurality of pancake coils includes nine coils in a stack;

means connecting said first, sixth and eighth coils together as a first phase winding;

means connecting said second, fourth, and ninth coils together as a second phase winding; and means connecting said third, fifth, and seventh coils together as a third phase winding.

6. An electric motor as set forth in claim 5, wherein the coils in each phase winding are connected in series.

7. An electric motor as set forth in claim 1, wherein said first and second magnetically permeable members are generally cylindrical with said second member inside said first member, and all said pancake coils substantially filling a generally cylindrical air gap between said first and second magnetically permeable members.

8. An electric motor as set forth in claim 7, wherein each of said pancake coils is arcuate form in an end view parallel to the axis of the cylindrical air gap, and a plurality of said pancake coils of equal radius in a given layer around the periphery.

9. An electric motor as set forth in claim 7, wherein successive stacked pancake coils become progressively larger with more conductor turns as the distance from the axis increases.

10. An electric motor as set forth in claim 7, wherein said stacked pancake coils become larger in both peripheral and longitudinal extent as the distance from the axis increases.

* * * * *

UNITED STATES PATENT AND TRADEMARK OFFICE
CERTIFICATE OF CORRECTION

PATENT NO. : 4,843,269

DATED : June 27, 1989

INVENTOR(S) : Daniel J. Shramo

It is certified that error appears in the above-identified patent and that said Letters Patent is hereby corrected as shown below: On the Title page:

In the abstract, line 7, after "formed" insert --from a plurality--.

In the abstract, line 10, "outer" should be omitted.

In the abstract, line 10, after "larger" please omit --,--.

Column 1, line 12, after "bearings" please omit --,--.

Column 2, line 61, "returning" should be --return--.

Column 2, line 63, "permits" should be --provides--.

Column 3, line 2, "permitting" should be --providing--.

Column 3, line 23, after "manufacture" please omit --,--.

Column 3, line 29, "plastic" should be --plastics--.

Column 3, line 30 "shortcircuiting" should be --short-circuiting--.

Column 3, line 31, "plastic" should be --plastics--.

Column 4, line 6, "perlayer" should be --per-layer--.

Column 4, line 37, "3" should be --C--, and "5" should be --6--.

Column 4, line 38, "terminal" should be --terminals--.

Column 4, line 38, "C" should be --3--.

Column 6, line 53, "invention" should be omitted.

UNITED STATES PATENT AND TRADEMARK OFFICE
CERTIFICATE OF CORRECTION

PATENT NO. : 4,843,269

DATED : June 27, 1989

INVENTOR(S) : Daniel J. Shramo

It is certified that error appears in the above-identified patent and that said Letters Patent is hereby corrected as shown below:

Column 8, line 35, after "is" insert --of--.

Signed and Sealed this

Twenty-fourth Day of April, 1990

Attest:

HARRY F. MANBECK, JR.

Attesting Officer

Commissioner of Patents and Trademarks